United States Patent [19]

Crowdy

[11] 4,026,353
[45] May 31, 1977

[54] HEAT EXCHANGERS

[75] Inventor: Edmund Porter Crowdy, Newcastle upon Tyne, England

[73] Assignee: Hawthorn Leslie (Engineers) Limited, Newcastle upon Tyne, England

[22] Filed: June 19, 1975

[21] Appl. No.: 588,147

[30] Foreign Application Priority Data

June 20, 1974 United Kingdom ............ 27416/74

[52] U.S. Cl. .............................. 165/135; 60/320; 181/36 C
[51] Int. Cl.² ........................................ F28F 13/00
[58] Field of Search ................. 165/135; 60/320; 181/36 C, 42, 48, 33 H

[56] References Cited

UNITED STATES PATENTS

| 1,966,620 | 7/1934 | Fluar, Jr. ...................... 165/135 X |
| 2,133,349 | 10/1938 | Gray .............................. 165/135 X |
| 2,620,167 | 12/1952 | Hopp .............................. 165/135 X |
| 2,655,346 | 10/1953 | Corbitt et al. ...................... 165/135 |
| 2,809,813 | 10/1957 | Fletcher ........................... 165/135 X |
| 2,942,855 | 6/1960 | Wellensiek ....................... 165/135 X |
| 3,043,096 | 7/1962 | McLoughlin .................... 181/36 C |
| 3,371,472 | 3/1968 | Krizman ......................... 181/36 C |
| 3,420,052 | 1/1969 | Miller ................................. 60/320 |
| 3,757,892 | 9/1973 | Raudman ........................ 181/36 C |

Primary Examiner—C. J. Husar
Assistant Examiner—Ira S. Lazarus
Attorney, Agent, or Firm—Larson, Taylor and Hinds

[57] ABSTRACT

A heat exchanger for exhaust systems of reciprocating engines has its walls in the form of hollow panels with access from the exhaust gas duct to within the panels so that pressure pulsations in the exhaust gas act both on the inside and outside of flat plates forming the duct bounding surfaces of the panels.

8 Claims, 6 Drawing Figures

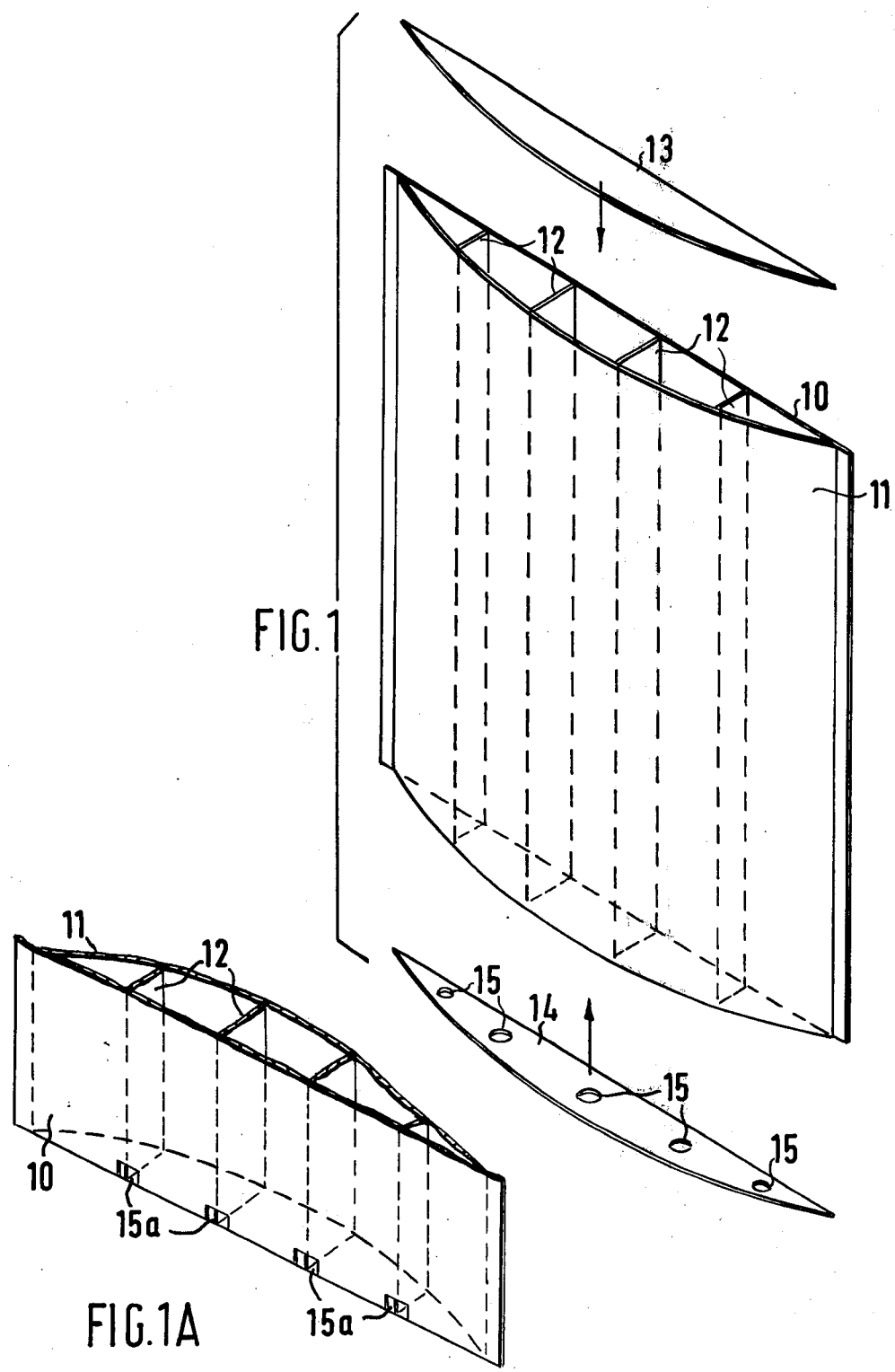

HEAT EXCHANGERS

DESCRIPTION

This invention relates to heat exchangers and is concerned particularly with gas heat exchangers suitable for use in exhaust systems of large, slow-speed diesel engines. The gas flow in the exhaust system of such an engine is inevitably of a pulsating nature and consequently the walls bounding the exhaust duct are subjected to corresponding pressure variations which cause the walls to vibrate.

The duct housing the tube matrix of such a heat exchanger is conveniently of rectangular cross-section and hitherto, in order to militate against the damaging effects of forced vibrations of the flat duct walls produced by the exhaust gas pulsations, the walls have been made robust and of large mass so as to keep the amplitude of any vibrations small. Consequently, the heat exchangers have been very heavy.

According to this invention, a heat exchanger has its walls formed by hollow panels, each hollow panel comprising a flat plate joined to an arcuately curved plate with stiffeners between them, the panels having their flat plates bounding the gas flow duct, and there being openings leading from within the duct into the panels to allow pulsations occurring within the duct to act on the surfaces of the flat plates remote from the gas stream.

The stiffeners will conveniently extend parallel to the direction of gas flow, the downstream end of each hollow panel being sealed by a segmental plate and the upstream end having secured to it a ported segmental plate to allow exhaust gas to penetrate into the spaces between the stiffeners. Alternatively, ports leading from the gas duct to the spaces in a panel between the stiffeners may be provided in the flat plate of the panel at or adjacent its upstream end.

In each case, gas pulsations are transmitted within the panels to the outer surfaces of the flat plates without there being a gas flow through the panels.

By constructing the duct of such panels, the inner flat plates are subjected on both surfaces to equivalent pressure pulsations and may therefore be relatively less robust than plates hitherto used in known constructions of rectangular duct heat exchangers. The outer arcuate plates, although subjected on one surface only to the pressure pulses, cannot be stimulated to vibrate in the manner of a flat plate. Consequently a heat exchanger according to this invention may be substantially lighter than an equivalent heat exchanger constructed in the known manner.

The accompanying drawings illustrate some forms of heat exchanger of this invention. In the drawings:

FIG. 1 is an exploded view of a hollow panel,

FIG. 1A illustrates a second form of panel,

Figure 3:
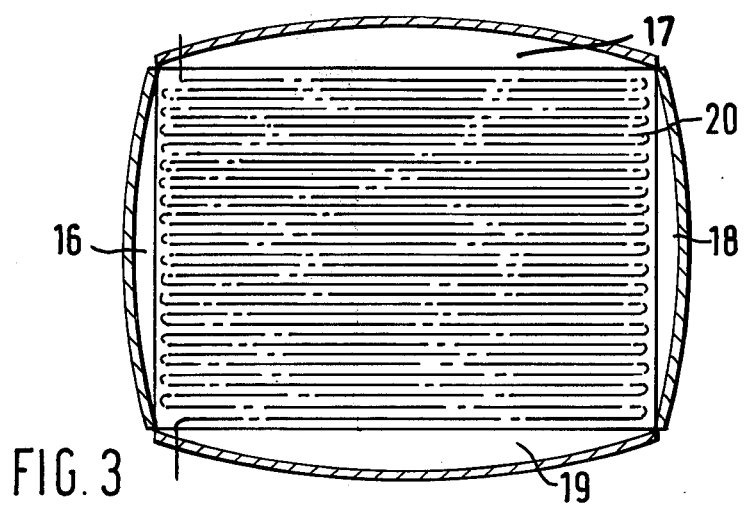
FIG. 3 is a diagrammatic section on the line 3—3 of FIG. 2.

In FIG. 1 there is illustrated a hollow panel comprising an inner flat plate 10, an outer arcuate plate 11, spaced flat stiffeners 12 extending parallel to the intended direction of gas flow and joining the flat and arcuate plates 10, 11, a downstream segmental plate 13 for closing off the space between the plates 10, 11 at one end, and an upstream segmental plate 14 with ports 15 for giving access to the spaces in the panel between the stiffeners.

In FIG. 1A the panel has both ends closed by segmental plates and ports 15a are formed in the upstream end of the flat plate 10 to give access to the spaces in the panel between the stiffeners 12.

Figure 2:
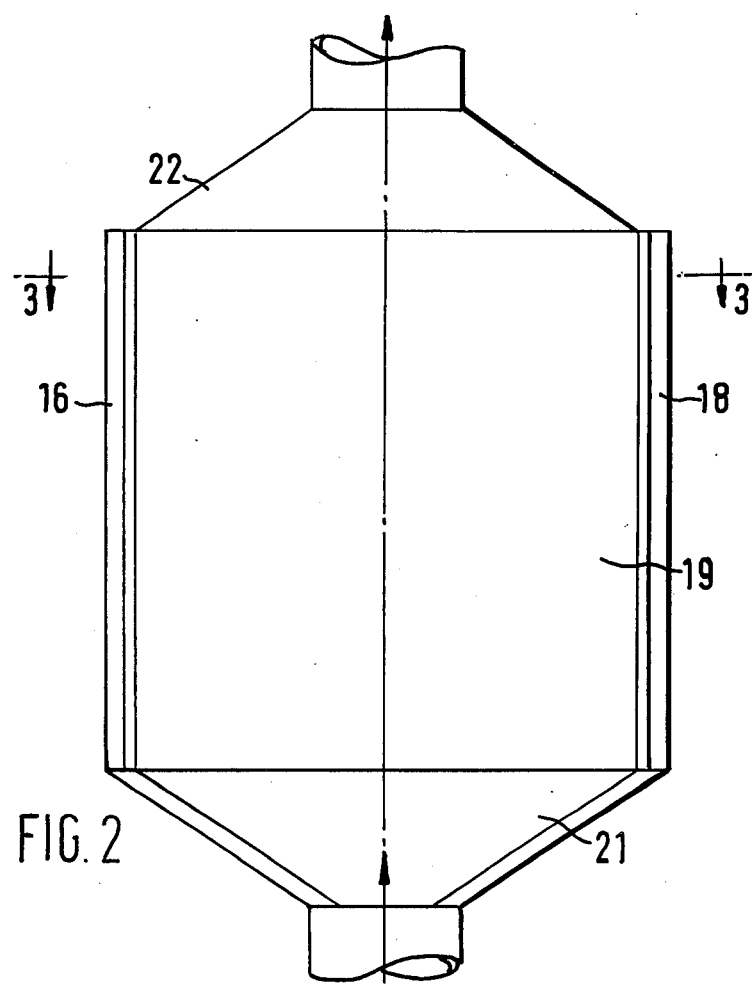
FIG. 2 is an external view of a heat exchanger.

A heat exchanger (FIGS. 2 and 3) will be formed from four such panels 16–19 joined together to produce a rectangular duct and within the duct a matrix of heat exchange tubes 20, of which the tubes extend straight from side to side of the duct transversely to the direction of gas flow.

The heat exchanger shown also comprises entry and outlet sections 21, 22. The entry section will be such that the exhaust gas path is connected through the ports 15 or 15a to the interiors of the panels 16–19.

The external surface of the heat exchanger will be suitably insulated.

Figure 5:
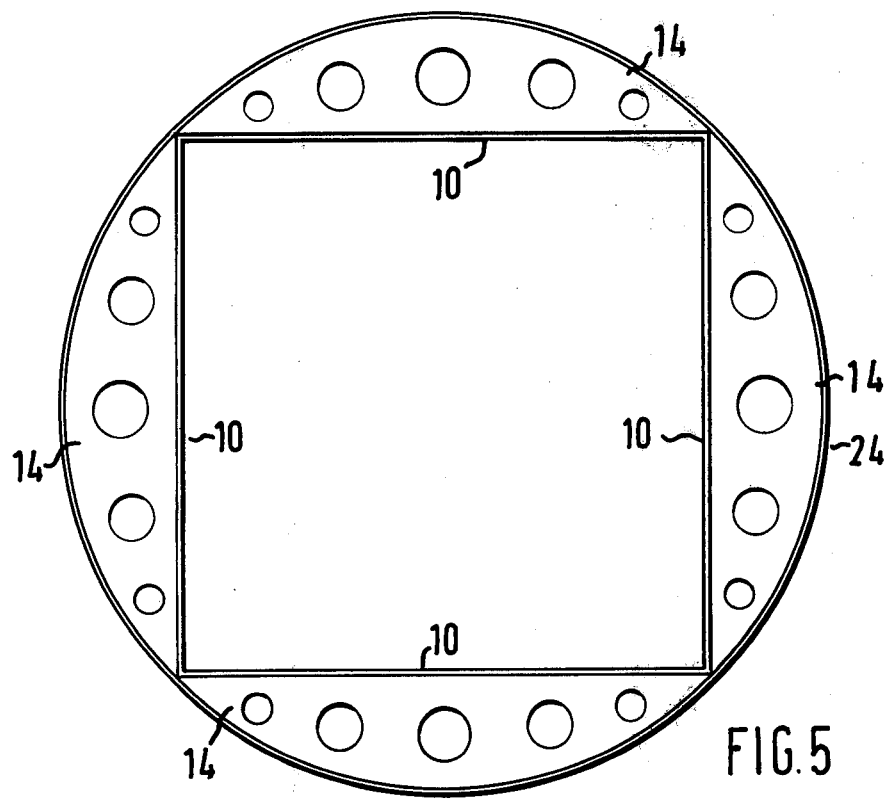
FIGS. 4 and 5 are diagrammatic views on the upstream ends of two forms of heat exchanger.
Figure 4:
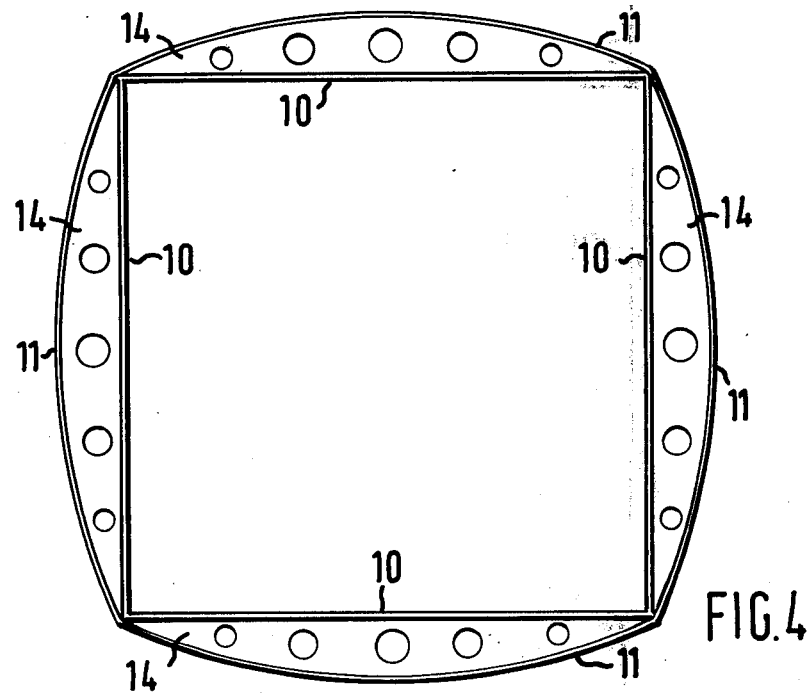

In FIGS. 4 and 5 the heat exchangers shown have square-section flow ducts. In such case, the outer wall 24 could be truly cylindrical (FIG. 5) but, although this form is best able to withstand internal pressures, conveniently in order to save space the outer plates of the panels will (as shown in FIG. 4) be of larger radius of curvature than the radius of the circumscribing circle of the square section duct, thereby making available for heat exchange a larger proportion of the space occupied by the heat exchanger.

I claim:

1. A gas heat exchanger for use in an exhaust system of a slow-speed diesel engine, the heat exchanger comprising means defining a gas flow duct of polygonal cross-section and a matrix of coolant tubes housed within the duct, said duct defining means including boundary walls formed by hollow panels, each hollow panel comprising a flat plate and an arcuately curved plate joined by its edges to the flat plate, and stiffeners extending longitudinally in the space between the plates and joined to them, the panels having their flat plates bounding the the gas flow duct, and there being openings leading from within the said duct into the panels to allow pulsations occurring within the duct to act on the sides of the flat plates remote from the gas stream.

2. A heat exchanger according to claim 1, wherein the stiffeners extend parallel to the direction of gas flow, the downstream end of each hollow panel being sealed by a segmental plate and the panel being ported at or adjacent its upstream end to allow exhaust gas to penetrate between the stiffeners.

3. A heat exchanger according to claim 2, wherein the upstream end of each panel has secured to it a ported segmental plate to provide access to the space between the stiffeners.

4. A heat exchanger according to claim 2, wherein the upstream end of each panel has secured to it a segmental plate and ports are provided in each flat plate at or adjacent its upstream end.

5. A heat exchanger according to claim 1, wherein the duct is rectangular and is formed by four such panels and the tubes of said coolant tube matrix housed in the duct extend straight from side to side of the duct.

6. A heat exchanger according to claim 5, having a duct of square section transversely to the gas flow wherein the outer wall of the duct is formed by the arcuately curved plates and is cylindrical.

7. A heat exchanger according to claim 5 having a duct of square section transversely to the gas flow wherein the arcuately curved plates of the panels form the outer wall of the duct and have a larger radius of curvature than the radius of the circumscribing circle of the duct.

8. A heat exchanger according to claim 1, wherein the duct is rectangular.

* * * * *